United States Patent [19]

Katz et al.

[11] Patent Number: 5,271,540
[45] Date of Patent: Dec. 21, 1993

[54] COMBINATION BICYCLE RACK AND SIDE CARRIER

[75] Inventors: Robert D. Katz; David Mitchell, both of Montreal, Canada

[73] Assignee: Robert D. Katz, Montreal, Canada

[21] Appl. No.: 888,917

[22] Filed: May 26, 1992

[51] Int. Cl.⁵ .............................................. B62J 7/00
[52] U.S. Cl. ................................ 224/32 A; 224/32 R
[58] Field of Search ............... 224/32 A, 32 R, 35, 224/36, 39, 40; 403/319, 326, 331

[56] References Cited

U.S. PATENT DOCUMENTS

| | | | |
|---|---|---|---|
| 2,229,756 | 1/1941 | McCann et al. | 224/39 |
| 2,704,626 | 3/1955 | Meier | 224/32 |
| 2,944,712 | 7/1960 | Glenny | 224/32 |
| 3,087,661 | 4/1963 | Glenny | 224/32 |
| 4,154,382 | 5/1979 | Blackburn | 224/39 |
| 4,350,361 | 9/1982 | Fujii | 224/32 |
| 4,353,490 | 10/1982 | Jackson et al. | 224/32 A |
| 4,383,625 | 5/1983 | Kiang | 224/39 |
| 4,402,439 | 9/1983 | Brown | 224/32 R |
| 4,760,943 | 8/1988 | Bass et al. | 224/39 |
| 4,762,255 | 8/1988 | Dunn | 224/32 |

FOREIGN PATENT DOCUMENTS 2047644 12/1980 United Kingdom ............ 224/32 R

Primary Examiner—Henry J. Recla
Assistant Examiner—David J. Walczak
Attorney, Agent, or Firm—Chilton, Alix & Van Kirk

[57] ABSTRACT

The bicycle rack consists of a substantially inverted U-shaped strut member and an elongated top member which overlies and is connected to the bridge of the U-shaped strut member. Side members extend from each side of the top member to overlap a portion of a respective leg of the U-shaped strut member. Each side member is substantially V-shaped and at least one leg of one side members carries an interface for releasably engaging a clip which is mounted on a side wall of the side container.

36 Claims, 11 Drawing Sheets

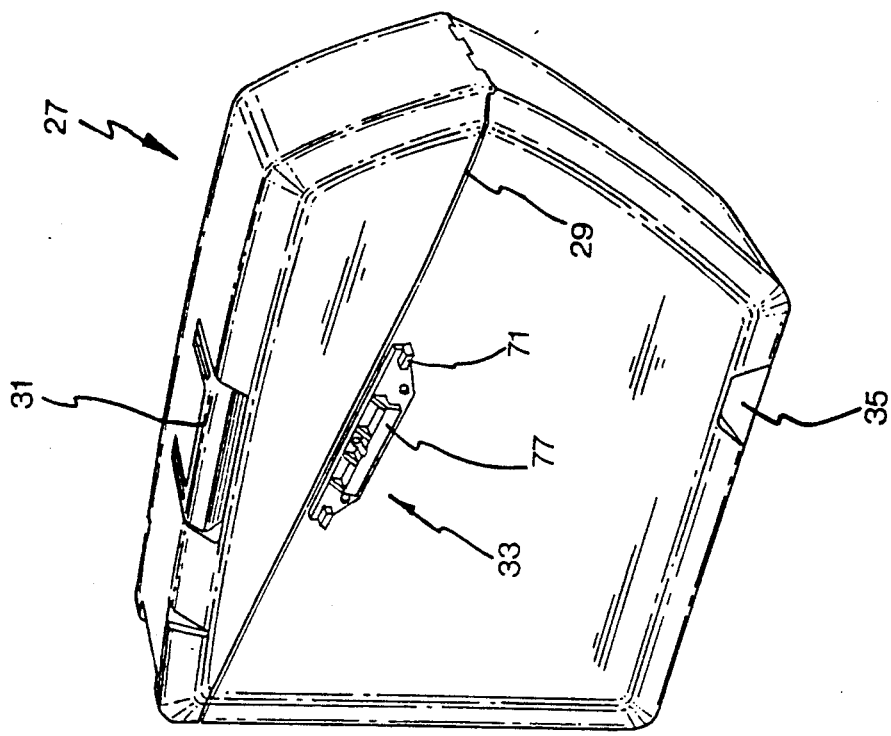
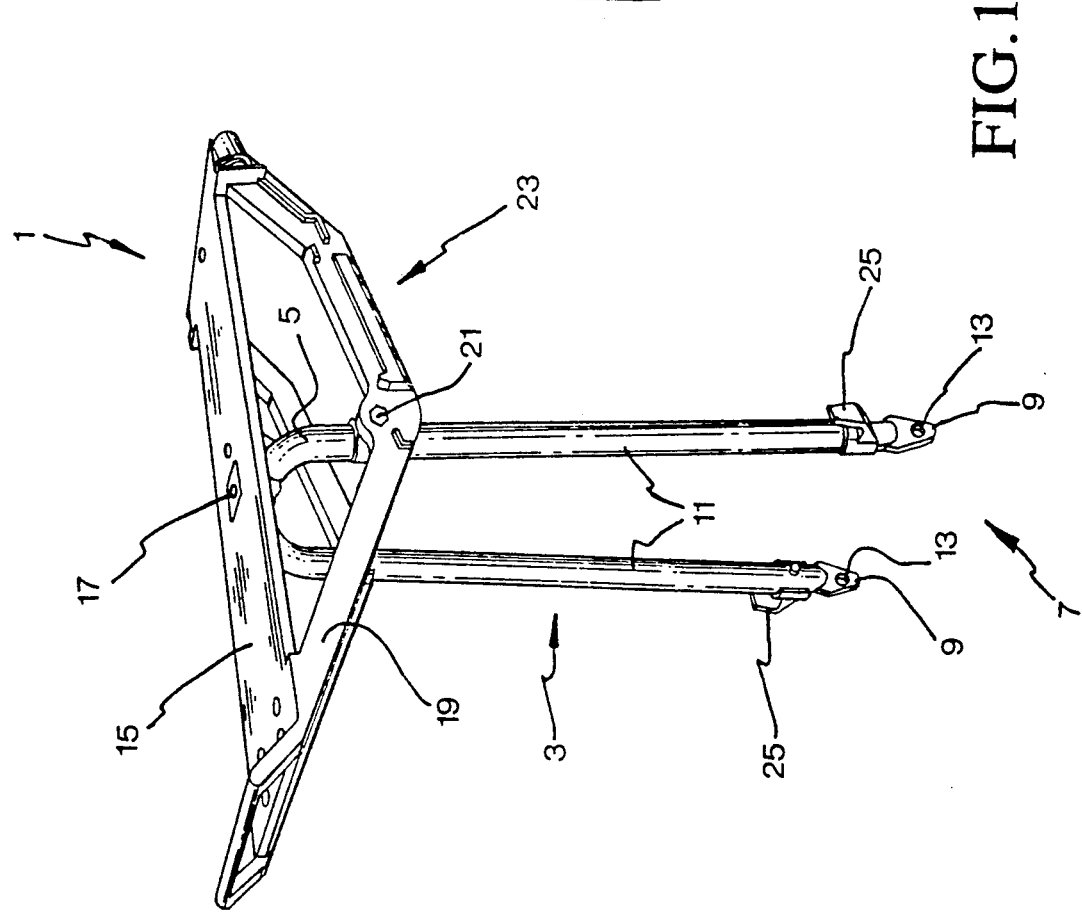
FIG.1

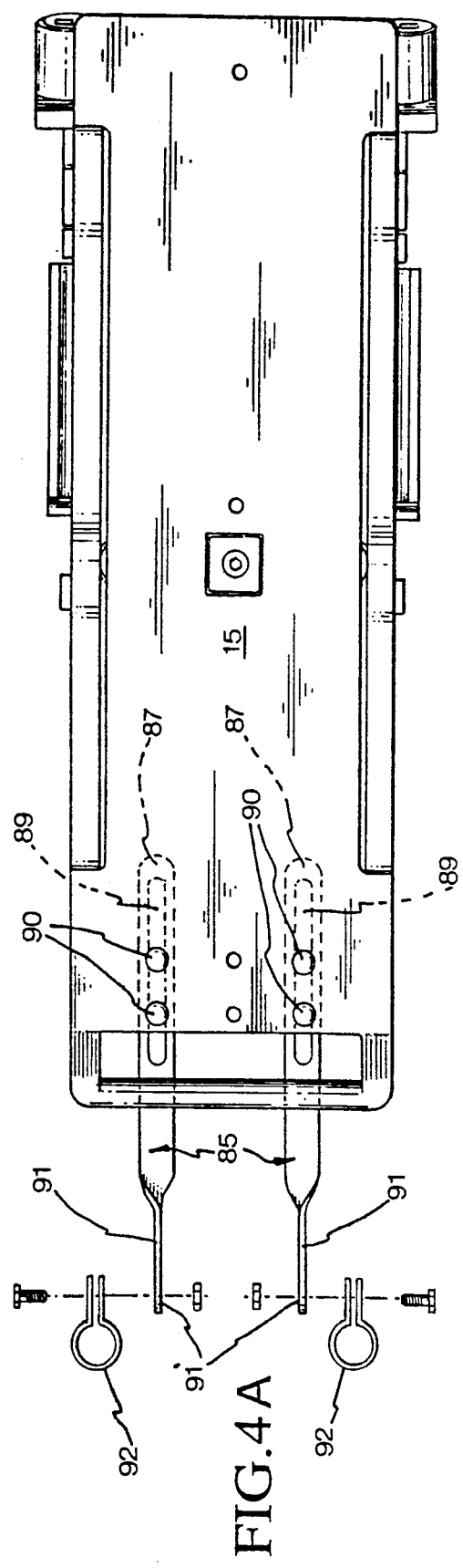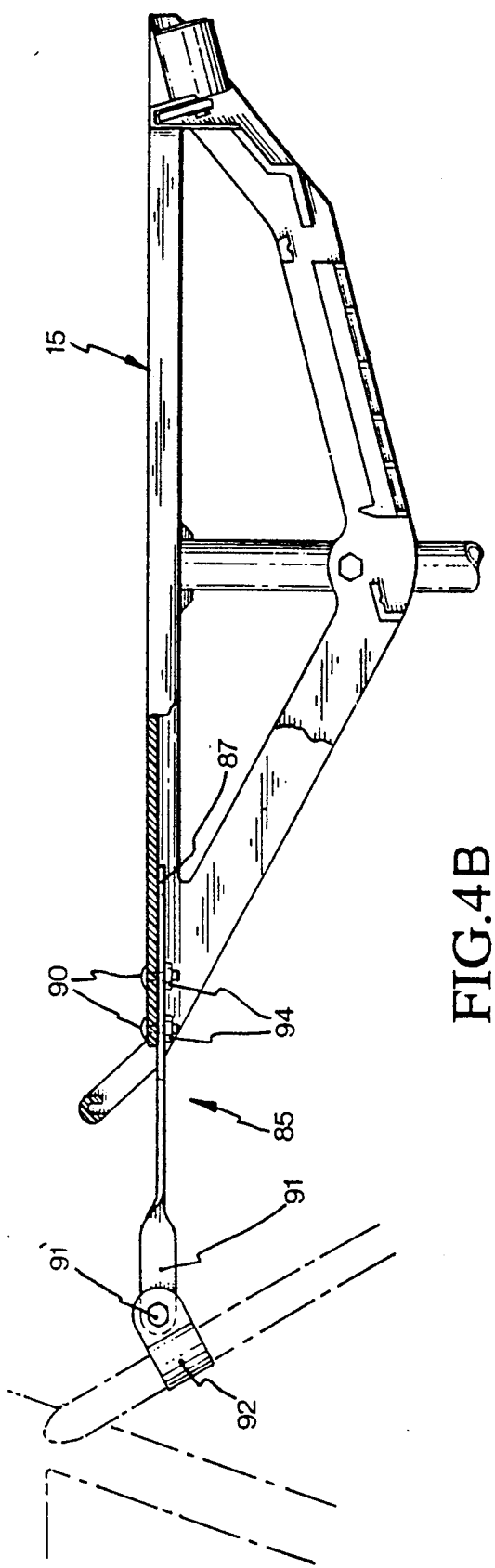
FIG.4A
FIG.4B

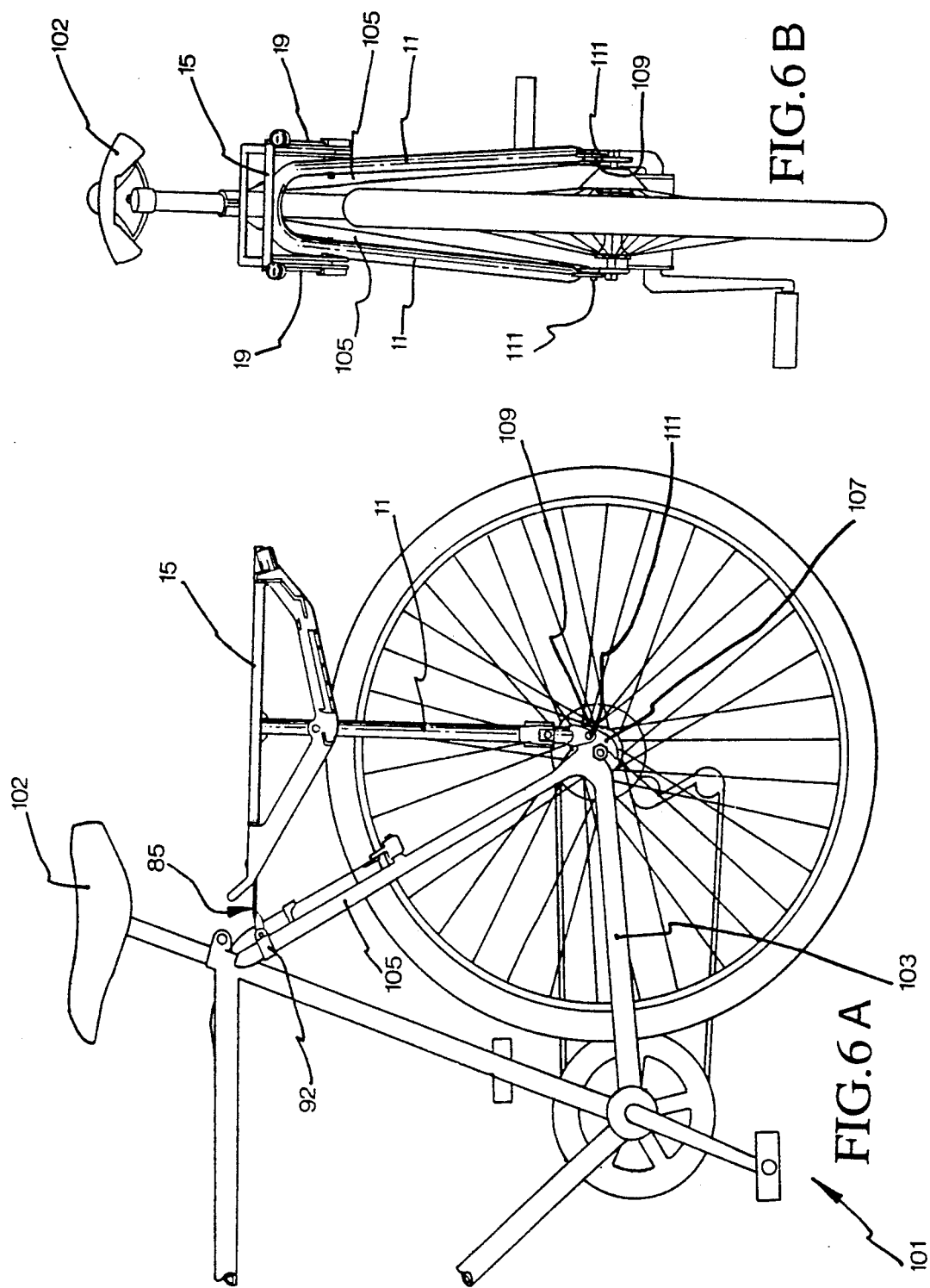

COMBINATION BICYCLE RACK AND SIDE CARRIER

BACKGROUND OF INVENTION

1. Field of the Invention

The invention relates to a novel bicycle rack. More specifically, the invention relates to such a rack mountable on the frame of a bicycle and adapted to support a side carrier on at least one side thereof. The invention also relates to an arrangement comprising the bicycle rack and the side carrier wherein the side carrier includes a clip on a side wall thereof and the rack includes an interface for releasably attaching the side carrier to the rack by engagement of the clip.

2. Description of Prior Art

Racks for mounting side carriers on the back wheels of bicycles are known in the art as illustrated in, for example, U.S. Pat. No. 2,944,712, Glenny, Jul. 12, 1960, U.S. Pat. No. 2,704,626, Meier, Jr., Mar. 22, 1955, U.S. Pat. No. 3,087,661, Glenny, Apr. 30, 1963, U.S. Pat. No. 4,762,255, Dunn, Aug. 9, 1988, U.S. Pat. No. 2,229,756, McCann et al, Jan. 28, 1941, U.S. Pat. No. 4,383,625, Kiang, May 17, 1983 and U.S. Pat. No. 4,154,382, Blackburn, May 15, 1979.

The '712 patent teaches an arrangement for mounting side carriers (baskets) 10 on the back wheel of a bicycle. The baskets are fixedly attached to the arrangement. The '646 patent teaches an arrangement for mounting side carriers (baskets) 20 on a bicycle, such that the side carriers can be easily removed without tools, by clipping a hook 40 onto the rear stay 12 of the bicycle.

In the '661 patent, side baskets 10 are attached at the rear end of a bicycle to the rear axle or frame and with bracket 18 to the rear fender. In the '255 patent, side baskets 10 are attached by nuts and bolts to diagonal frame member 13 and horizontal frame member 15.

In all of the above arrangements, rack members are not used for attaching the side carriers to the bicycle. Instead, the side carriers are mounted either directly to the bicycle or to the bicycle by brackets.

In the '756 patent, there is taught a rack member, as shown in FIGS. 2 and 3, for mounting a top carrier 21. The sides of the rack member, as seen in FIG. 2, are triangular in shape.

Both the '625 patent and the '382 patent also teach bicycle racks for mounting over the back wheel of a bicycle and having side members which are triangular in shape.

In all of the '756, '625 and '382 patents, the racks do not include facilities for mounting side carriers.

SUMMARY OF INVENTION

It is therefore an object of the invention to provide a bicycle rack mountable on the frame of the bicycle which includes specific facilities for mounting a side carrier on at least one side thereof.

It is a more specific object of the invention to provide a rack for mounting a side carrier which has a clip on one side wall thereof, the rack including interface means for releasably engaging the clip.

In accordance with a particular embodiment of the invention there is provided a bicycle rack for mounting on the frame of a bicycle, and being adapted to support at least one side container, said side container having at least one side wall and having a clip means mounted on said one side wall;

said rack comprising;
a substantially inverted U-shaped strut member having a top end, formed by the bridge of said U-shape, and a bottom end, comprising the ends of the spaced apart legs of said U-shape, said ends of said legs being connectable to respective sides of said frame of said bicycle to connect said rack to said bicycle;
side members overlapping a portion of a respective leg of said U-shaped strut member; and
an interface means on at least one of said side members, said interface means engaging said clip means to releasably attach said side container to said rack.

In accordance with a further particular embodiment of the invention there is provided in combination, a bicycle rack and side container arrangement, said bicycle rack being mountable on the frame of said bicycle;
said bicycle rack releasably supporting said side container;
said side container comprising at least one side wall and including clip means on said one side wall;
said rack comprising;
a substantially inverted U-shaped strut member having a top end, formed by the bridge of said U-shape, and a bottom end comprising the ends of the spaced apart legs of said U-shape, said ends of said legs being connectable to respective sides of said frame of said bicycle to connect said rack to said bicycle;
side members overlapping a portion of a respective leg of said U-shaped strut member; and
an interface means on at least one of said side members, said interface means engaging said clip means to releasably attach said side container to said rack.

In accordance with a still further particular embodiment of the invention there is provided a bicycle rack for mounting on the frame of a bicycle, and being adapted to support at least one side container, said side container having at least one side wall and having a clip means mounted on said one side wall;
said rack comprising;
a substantially inverted U-shaped strut member having a top end, formed by the bridge of said U-shape, and a bottom end, comprising the ends of the spaced apart legs of said U-shape, said ends of said legs being connectable to respective sides of said frame of said bicycle to connect said rack to said bicycle;
an elongated top member overlying and being connected to said top end of said strut member;
side members extending from each side of said top member to overlap a portion of a respective leg of said U-shaped strut member;
each said side member being substantially V-shaped and having an apex and two legs, the ends of the legs being connected to respective ends of the top member at respective sides thereof, each apex being connected to a respective leg; and
an interface means on one leg of at least one of said side members, said interface means engaging said clip means to releasably attach said side container to said rack.

In accordance with a still further particular embodiment of the invention there is provided, in combination, a bicycle rack and side container arrangement, said bicycle rack being mountable on the frame of said bicycle;

said bicycle rack releasably supporting said side container;

said side container comprising at least one side wall and including clip means on said one side wall;

said rack comprising;

a substantially inverted U-shaped strut member having a top end, formed by the bridge of said U-shape, and a bottom end comprising the ends of the spaced apart legs of said U-shape, said ends of said legs being connectable to respective sides of said frame of said bicycle to connect said rack to said bicycle;

an elongated top member overlying, and being connected to, said top end of said strut member;

side members extending from each side of said top member to overlap a portion of a respective leg of said U-shaped strut member;

each said side member being substantially V-shaped having an apex and two legs, the ends of the legs being connected to respective ends of the top member at respective sides thereof, each apex being connected to a respective leg; and an interface means on one leg of at least one of said side members, said interface means engaging said clip means to releasably attach said side container to said rack.

BRIEF DESCRIPTION OF DRAWINGS

The invention will be better understood by an examination of the following description, together with the accompanying drawings, in which:

FIG. 1 is a perspective view a bicycle rack and a side carrier adaptable to be mounted on the bicycle rack;

FIGS. 4A and 4B illustrate the adjustable fastening arms of the bicycle rack and the method of connecting the adjustable fastening arms to the bicycle rack;

FIGS. 6 and 6B illustrate how the bicycle rack would be mounted over the rear wheel of a bicycle;

DESCRIPTION OF PREFERRED EMBODIMENTS

Figure 2A:
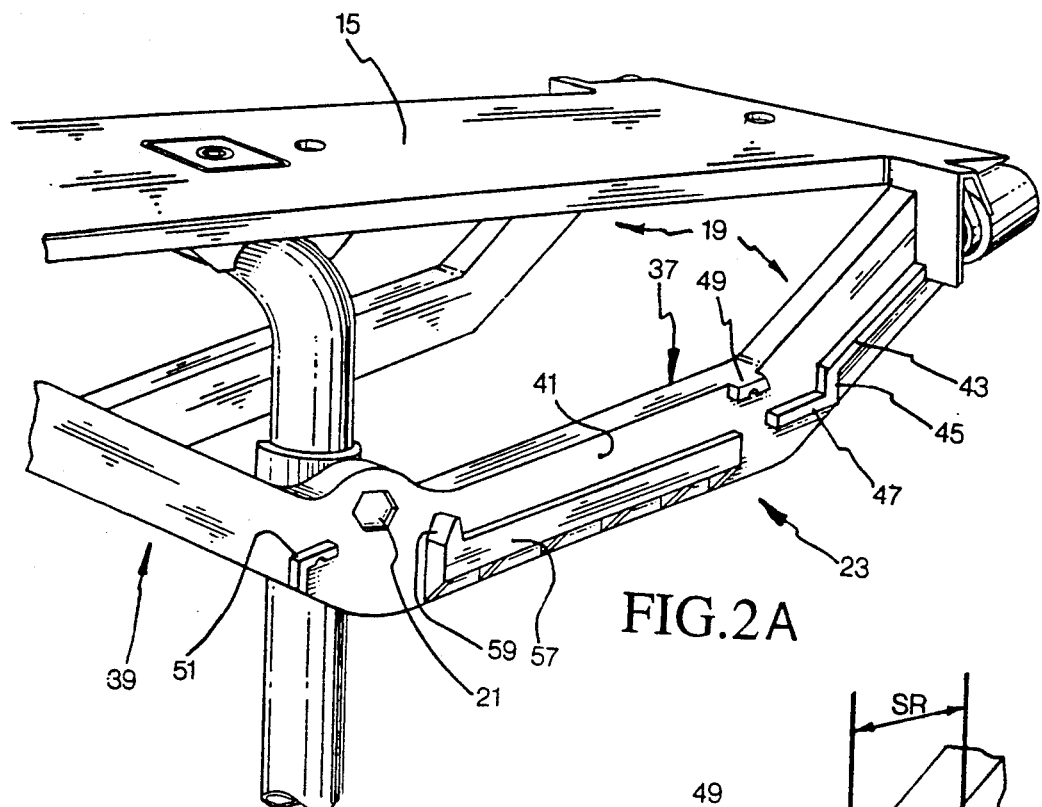
FIG. 2A is an enlargement of a portion of the bicycle rack.

Referring to FIG. 1, a bicycle rack in accordance with the invention, illustrated generally at 1, comprises a U-shaped strut member 3 having a top end which forms a bridge 5, and a bottom end 7 having ends 9 of spaced apart legs 11. The ends 9 of the legs 11 include openings 13 for connecting the rack to the bicycle as described below.

An elongated top member 15 overlies and is connected to the bridge 5 of the U-shaped strut member 3. A bolt 17 connects the elongated top member 15 to the bridge 5. The top member 15 can support a top carrier as known in the art.

Two side members 19 each overlap a respective one of the legs 11 (see also FIG. 6B) and are attached to their respective legs 11 by bolts 21. The side members are substantially triangular in shape with the top ends of each leg of the triangle being connected to a respective end of the elongated top member 15. The side members are connected to their respective legs at the apex of the triangles. Included on one of the legs of at least one of the side members is an interface member 23 which is described in greater detail in association with FIGS. 2A and 2B.

Mounted near the bottom of each leg 11 is a bottom clip 25.

A side container 27 is particularly adapted to be mounted on a side member of the rack. In a preferred embodiment, an interface 23 will be included on both side members so that a side container can be mounted on both sides of the rack.

As can been seen, the side container 27 includes a parting line 29 along which line the container is openable. It also includes a foldable handle 31 at the top surface thereof.

Aligned with the parting line 29, and underlying the line 29, is a clip 33 which will be more fully described in association with FIG. 3 below. The clip is mounted on a mounting surface of the container 27.

At the bottom end of the mounting surface is a cavity 35 whose function will be more fully described below.

Figure 2B:
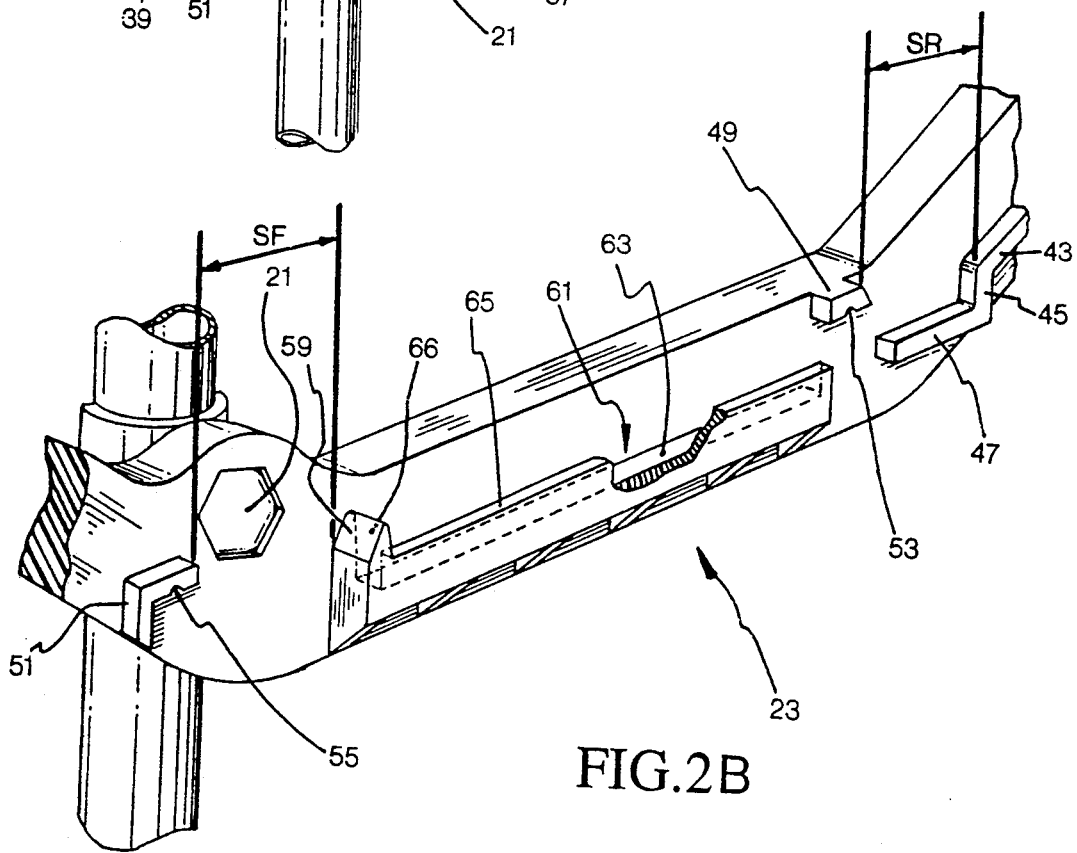
FIG. 2B is an enlargement of a portion of FIG. 2A.

Turning now to FIGS. 2A and 2B, each side member of the bicycle rack includes a first leg 37 and a second leg 39. The first leg 37 includes a wall 41 and disposed near the top end of the leg 37 at the bottom edge of the wall 41, and extending outwardly of wall 41, is a runner guide 43 having an L-shaped termination comprising a bar 45 and a leg 47. Disposed at the top edge of the wall 41, and extending outwardly therefrom, and adjacent the end of the leg 47, is a rear stopper 49. The upper surface of the bar 45 and the upper end of the stopper 49 define between them a space $S_R$.

Disposed at the bottom end of leg 37, i.e., approximately at the apex of the side member 23 is a front stopper 51 which is in the form of an inverted L and which extends outwardly of wall 41. Stopper 49 includes, in the bottom surface thereof, a depression 53 and stopper 51 includes, in the bottom surface thereof a depression 55.

Extending along the bottom edge of the leg 37, and extending outwardly of the wall 41, is an elongated L-shaped hook 57. Disposed at the bottom end of the L-shaped hook 57 is a butt 59. Space $S_F$ is defined between the free end of the leg of 51 and the butt 59.

As seen in FIG. 2B, the elongated L-shaped hook includes an elongated bar 61 whose top surface defines an elongated floor 63. The L-shaped hook also includes an elongated leg 65. The butt 59 has a butting surface 66.

Figure 3A:
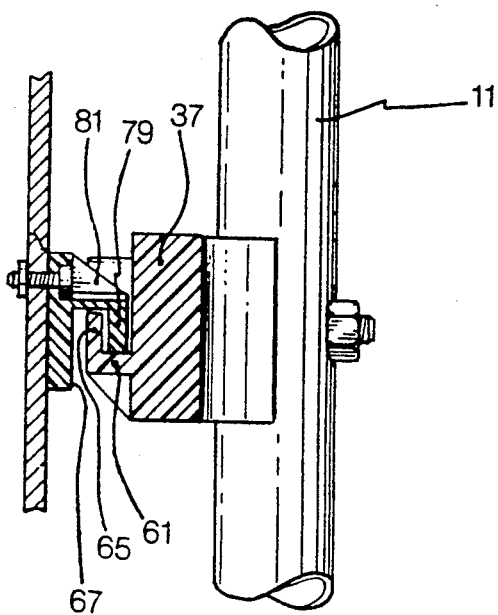
FIG. 3A illustrates how the hook of the interface engages the hook of the clip.
Figure 3:
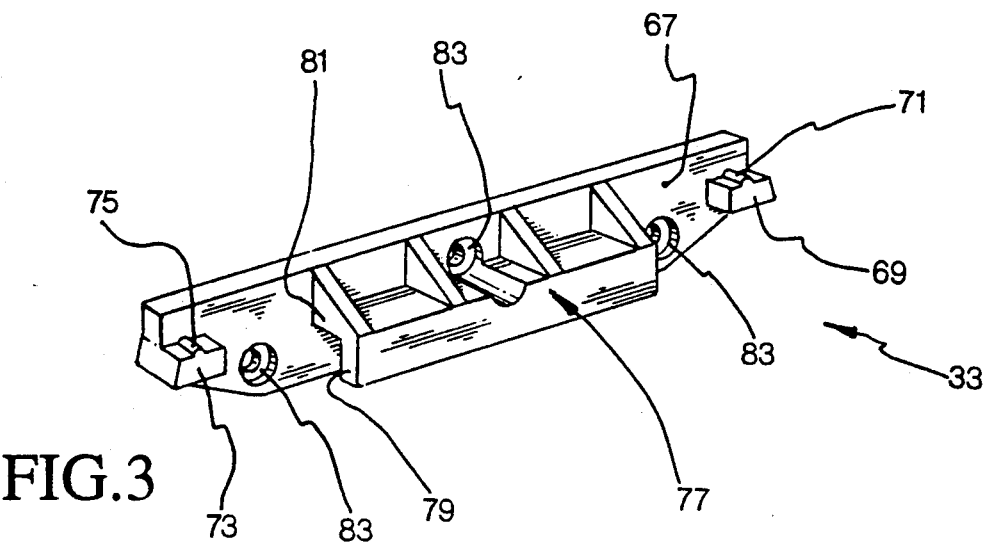
FIG. 3 is an enlargement of the clip of the carrier.

Turning now to FIG. 3, the clip 33 includes a wall 67. Mounted on the wall and extending outwardly therefrom is a first stabilizer 69 having, on the top surface thereof, a protuberance 71. Also mounted on the wall 67, and extending outwardly therefrom, is a second stabilizer 73 having a protuberance 75 at the top surface thereof.

Finally, mounted on the wall 67, and extending outwardly therefrom, is an elongated inverted L-shaped hook 77 having a bar 79 and a leg 81.

The clip 33 also includes openings 83 for receiving screws or the like for fixedly mounting the clip on the side container 27.

Turning now to FIGS. 4A and 4B, as can be seen, adjustable fastening arms 85 are adjustably mounted at the front end of the elongated top member 15. Each adjustable fastening arm 85 includes an elongated flat portion 87 having a slotted opening 89 therein. At the front end of each adjustable fastening arm is a clamp receiving portion 91 having an opening 91' for receiving a screw or the like.

The elongated top member 15 includes fixed bolts 90, with threaded rods for receiving nuts 94. To mount the adjustable fastening arms onto the elongated top member, nuts 94 are removed and the adjustable fastening arms 85 are disposed to underlie the elongated top member 15 so that the threaded rods extend through the slotted opening 89. The adjustable fastening arms are then moved left or right until their correct position is determined where upon the nuts 94 are mounted on the threaded rods of bolts 90 and tightened so that the adjustable fastening arms 85 remain in their adjusted positions.

The adjustable fastening arms 85 are preferably made of a material which is easily bendable so that the clamp receiving portions 91 can be moved into position with a clamp 92 as will be described below.

Figure 5B:
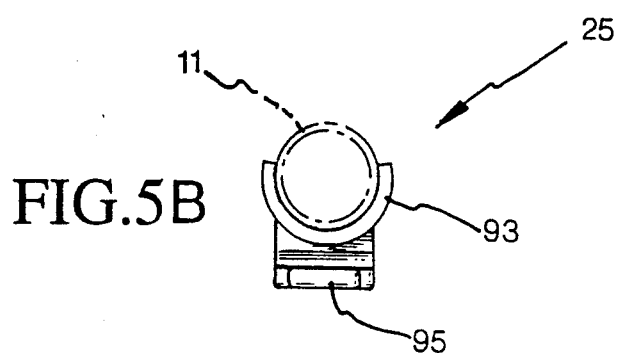
FIGS. 5A, 5B and 5C are front, top and side views respectively of the bottom clips of the bicycle racks.
Figures 5A, 5C:
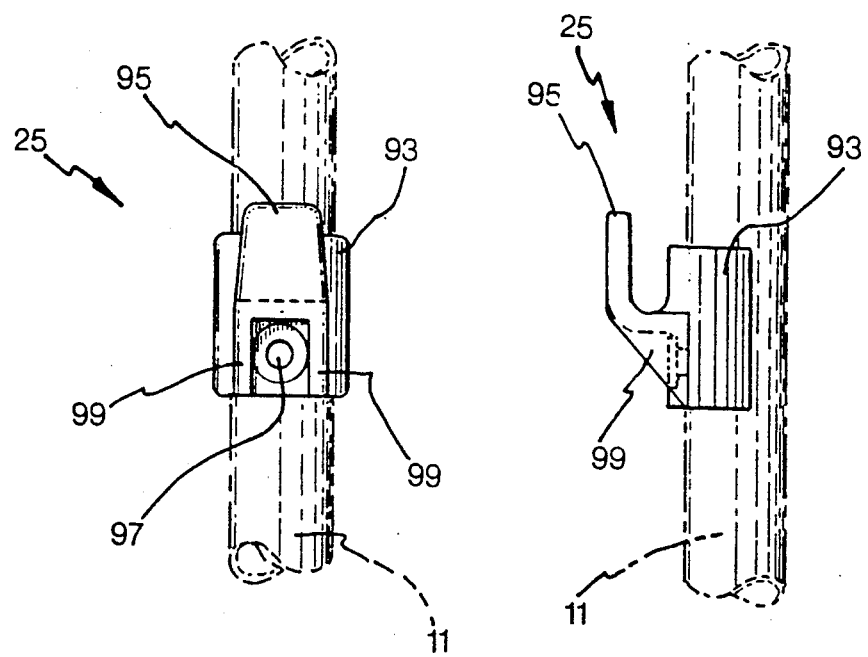

Turning now to FIGS. 5A, 5B and 5C, the bottom clip 25 comprises an arced strut engaging portion 93, which, embraces a strut 11, and a hook portion 95. Screw hole 97 extends between flanges 99 and the bottom clip 25 is fixedly attached to a respective strut 11 by means of a screw, or other fastener, which extends through the hole 97.

FIG. 6A and 6B illustrate how the rack would be mounted over the back wheel of a bicycle. In the Figures, bicycle 101 has a seat 102, chain stays 103 and seat stays 105. Drop outs 107, which are attached to the bottom ends and the right hand ends of seat stays 105 and chain stays 103, include a hook for hooking onto the axles of the rear wheels at either end thereof. The drop outs will quite often include a screw receiving opening. Alternatively, braise-ons 109 can be welded onto the drop outs. The braise-ons would comprise a cylindrical member having screw threads on the inner surface for receiving screws 111 which will extend through openings 13 of legs 11. Adjustable fastening arms 85 are adjusted to fit into clamps 92, one clamp being mounted on each of the seat stays 105, and are fastened to the clamps by nut and bolt arrangements. In operation, the rack is first mounted on the bicycle as above described. A side carrier is then mounted on one of the side members as follows:

The side carrier is held up against the side member with the clip 33 above the interface 23 such that front stabilizer 69 is above the space $S_F$ and rear stabilizer 73 is above the space $S_R$. The side carrier is then lowered so that the stabilizers fall below the levels of rear stopper 49 and front stopper 51. As soon as this happens, L-shaped hooks 57 and 77 engage, and L-shaped hook 57 supports the weight of the side carrier 27. At the same time, the hook portion 91 of bottom clip 25 will align itself in the depression 35 at the bottom of side carrier 27.

The carrier is then moved downwardly at the angle of the leg 37 until protuberance 71 snaps into depression 55 and protuberance 75 snaps into depression 53. At this point, the front end of the stabilizer 69 will abut against the bar of the front stopper 51 and the front end of elongated inverted L-shaped hook 77 will abut against the surface 66 of butt 59. In addition, the hook on the interface will engage the hook on the clip as shown in FIG. 3A. Thus, the carrier will be held in place by the following forces:

Horizontal movement from right to left in FIG. 2 will be prevented by the bar of 51 and the butt 59.

Horizontal movement from left to right will be prevented by the force of gravity, and by the action of protuberance 71 engaging in depression 55 and protuberance 75 engaging in depression 53.

Vertically upward movement will be prevented by rear stopper 49 and front stopper 51.

Vertically downward movement will be prevented by the engagement of rotated L-shaped hook 77 with L-shaped hook 57 as well as by the engagement of hook 25 in cavity 35.

Rotation of the carrier about the interface 23/clip 33 axis is prevented by lower clip 25 in cavity 35.

Clockwise rotation is prevented by the action of stopper 51 on stabilizer 69, and counter-clockwise rotation is prevented by the action of stopper 49 on stabilizer 73.

As will be appreciated from the above description, the clip of FIG. 3 would be rotated through 180 degrees (so that it faces inwardly into the paper instead of outwardly as illustrated) to be mounted in the interface illustrated in FIG. 2A. If the interface were mounted on the other side member and on the rearward leg, then the interface would be a mirror image of the interface illustrated in FIG. 2A. The clip illustrated in FIG. 3 would then be mounted directly onto the mirror image interface without need for rotation.

Figure 7:
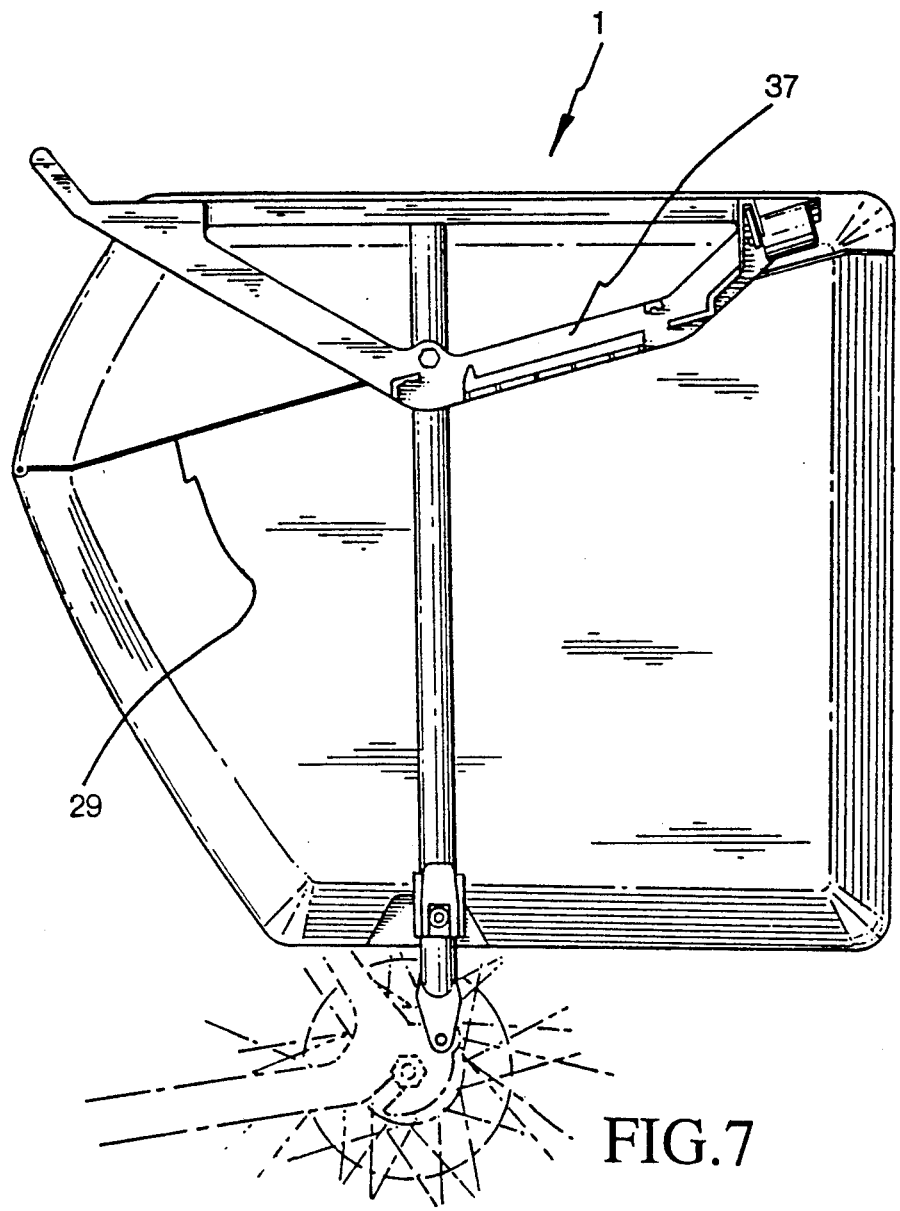
FIG. 7 is a rear view of the side container mounted on the bicycle rack.

Turning to FIG. 7, it can be seen that the parting line 29 of the container 27 extends at the same angle as the angle of leg 37 of the rack 1. The container is attached to the rack at approximately the center of gravity of the container.

In the embodiment illustrated in FIGS. 1 to 7, a top member 15 was included for the purpose of mounting a top carrier. However, it is possible to implement the invention without the use of such a top member, and various other embodiments are illustrated in FIGS. 8, 9, 10 and 11.

Figure 8:
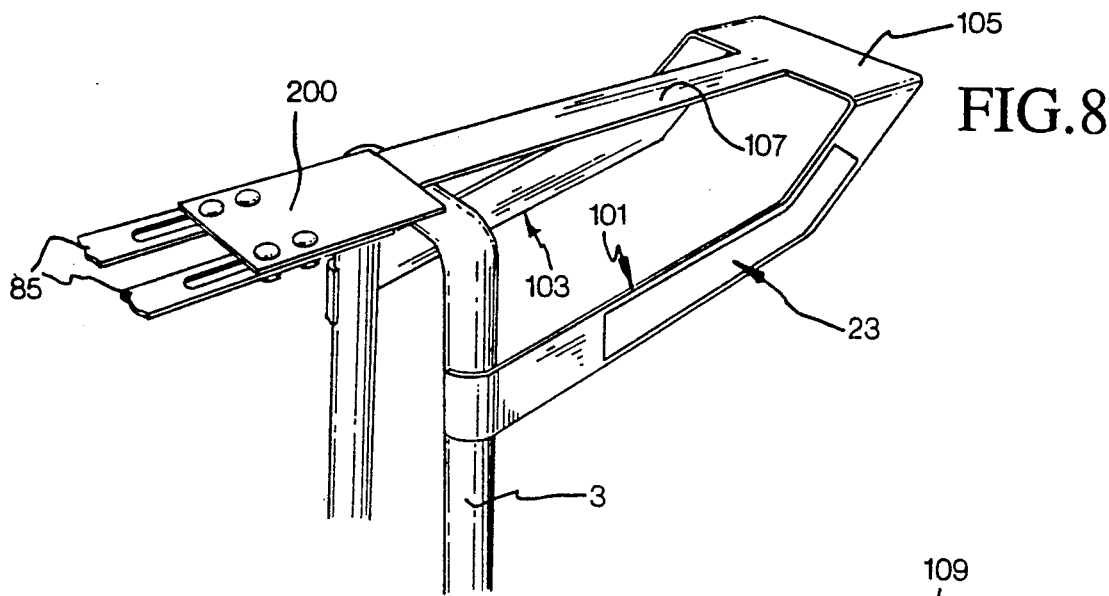
FIGS. 8, 9, 10 and 11 illustrate alternative embodiments of the invention.

Referring to FIG. 8, the side members comprise the legs 101 and 103 which are joined together by a cross-member 105. As will be apparent to one skilled in the art, the elements 101, 103 and 105 could be formed as a single integral unit or they could be formed from three different pieces. Longitudinal bar 107 is connected between the cross-member 105 and the strut member 3 to provide structural support. Once again, the interface 23 would be mounted on either legs 101 as shown or 103.

Figure 9:
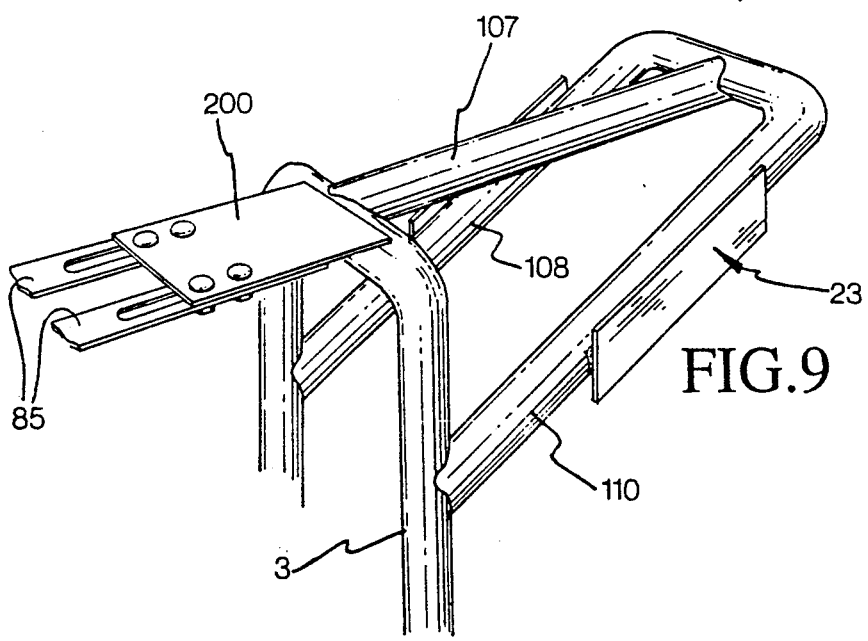

In FIG. 9, the side members are formed of a single U-shaped member 109 which has legs 108 and 110. Once again, the longitudinal cross-member 107 is provided for support, and the interface 23 is mounted on either leg 110, as shown, or 108, or both.

Figure 10:
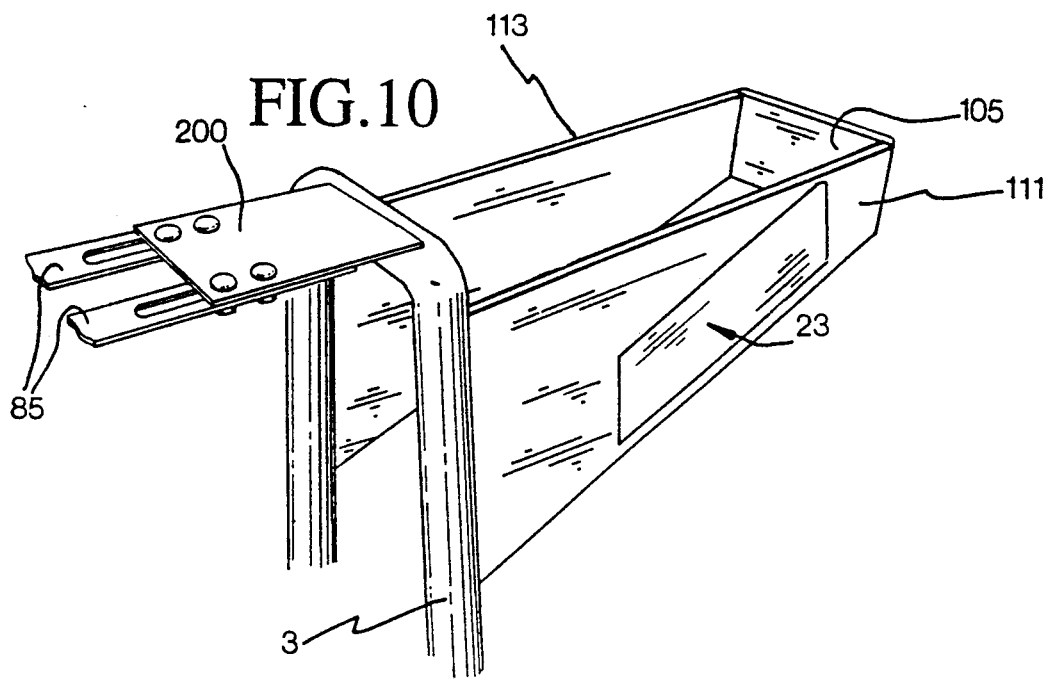

In the FIG. 10 embodiment, the side members comprise plates 111 and 113 joined together by cross-member 105. Once again, the elements 111, 113 and 105 could be formed integrally as a single unit or from three different parts connected together. The plates 111 and 113 would be wide at the end adjacent to the strut member 3 so that the longitudinal member 107 is not required. Once again, the interface 23 is mounted on either leg 111, as shown, or 113, or both.

Figure 11:
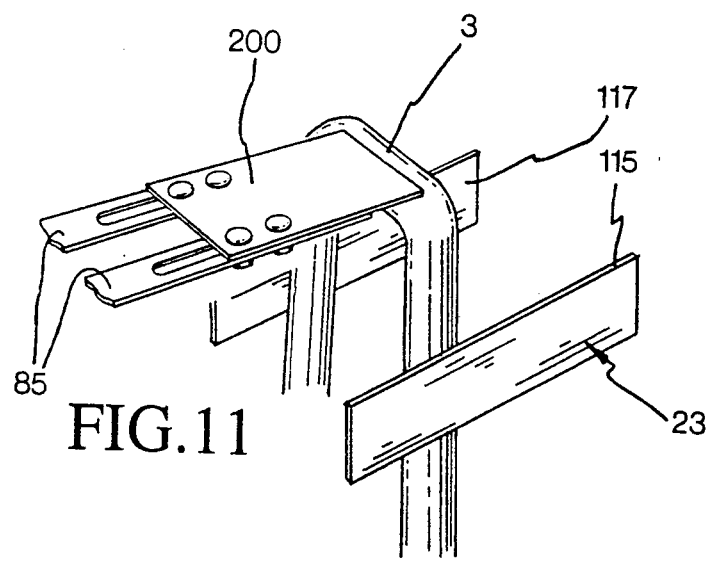

In the FIG. 11 embodiment, the side members comprise simply plates 115 and 117 mounted centrally on the strut member 3. The interface 23 would, once again, be mounted on either plate 115, as shown, or plate 117, or both.

In all of the above embodiments, it is of course necessary that the interface be mounted in such a manner as to pick up all of the loading of the side carrier 27. In the FIG. 11 embodiment, in order to mount the carrier about the center of gravity, it may be necessary to mount the strut member 3 angled rearwardly instead of vertically up and down.

Although in the illustrated embodiment, the rack is mounted over the rear wheel of a bicycle, by suitable modifications, and within the scope of the present invention, it would be possible to mount the rack over the front wheel of a bicycle. In addition, although the interface is shown mounted on the right hand leg, it could just as easily be mounted on the left hand leg whereupon the clip on the container would be suitably altered.

In all of FIGS. 8 to 11, a plate 200 is mounted on the bridge of the strut member 3 for adjustably mounting adjustable fastening arms 85 which would then be connected to clamps 92 (FIG. 6A) as above described.

Figure 12:
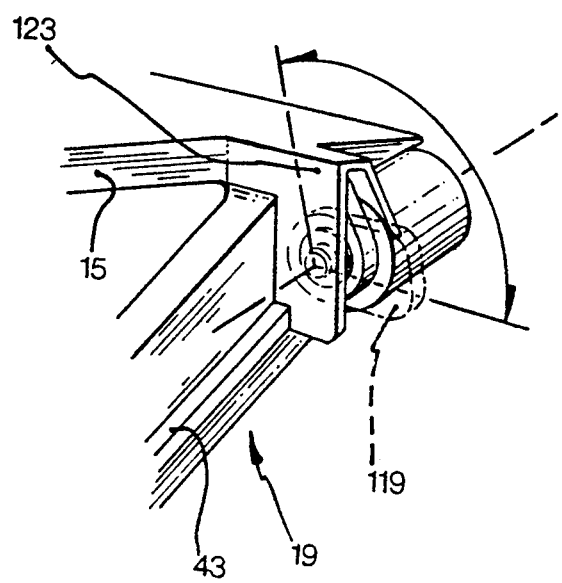
FIG. 12 is a perspective view of a locking arrangement for locking the container to the rack.
Figure 13:
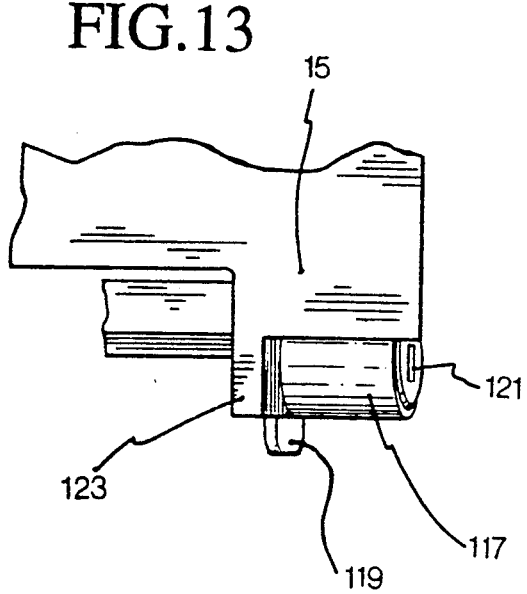
FIG. 13 is a top view of FIG. 12.
Figure 14:
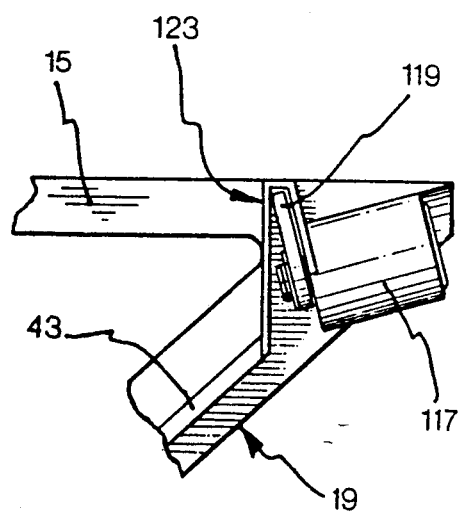
FIG. 14 is a side view of FIG. 12.
Figure 15:
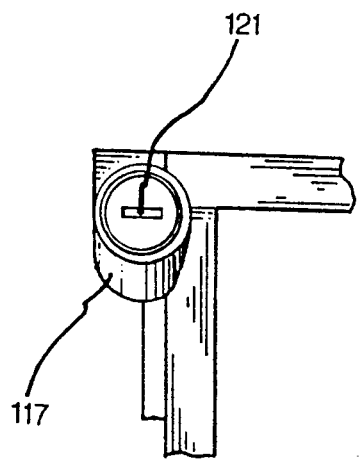
FIG. 15 is an end view of FIG. 12.
Figure 16:
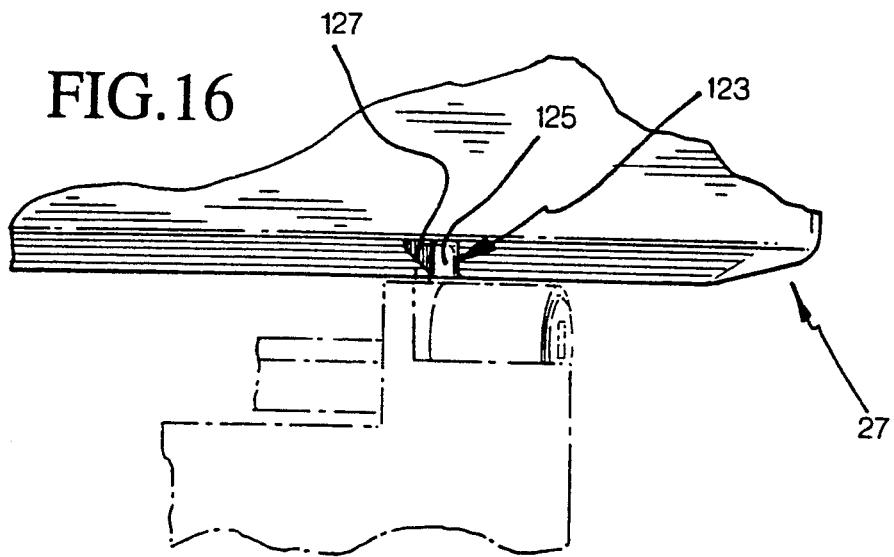
FIG. 16 is a top view of the receiving cavity in the container for receiving the cam of the locking arrangement.
Figure 17:
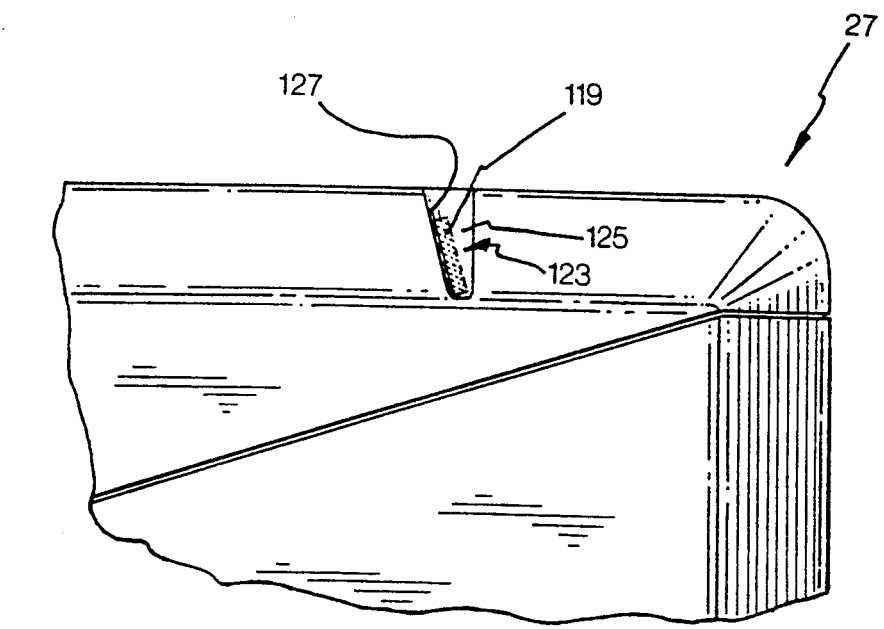
FIG. 17 is a side view of the receiving cavity.

A locking arrangement, for locking the container to the rack, is illustrated in FIGS. 13 to 15, while a cavity for receiving the cam of the locking arrangement is illustrated in FIGS. 16 and 17. Referring to FIGS. 12 to 15, the locking arrangement, illustrated generally at 115, is located at the rear top of the rack (see also FIGS. 1, 2A and 4B). The locking arrangement includes a lock cylinder 117 having a cam 119. The cylinder has a key hole 121.

A housing 123 is provided for the cam 119. As can be seen, the cam will extend at an angle to the longitudinal axis of the top member 15 of the rack.

When the key is turned, the cam 119 will be rotated out of the housing 123 to extend from the cylinder as shown in dotted lines in FIG. 12.

The cavity 123 for receiving the cam is at a mating position in the container as shown in FIGS. 1 and 7. As can be seen in FIGS. 16 and 17, the cavity includes a vertical opening 125 and a tapered opening 127. The cam will fit into the cavity as shown in dotted lines in FIG. 17. With the cam in this position, it will not be possible to move the container rightwardly and upwardly so that the container will be locked to the rack.

As will be apparent, a lock can be placed on both sides of the rack and is preferrably in the rear corner of each side member 19 of the rack.

Although several embodiments have been described, this was for the purpose of illustrating, but not limiting, the invention. Various modifications, which will come readily to the mind of one skilled in the art, are within the scope of the invention as defined in the appended claims.

I claim:

1. A bicycle rack for mounting on the frame of a bicycle, and being adapted to support at least one side container, said side container having at least one side wall and having a clip means mounted on said one side wall; said rack comprising;

a substantially inverted U-shaped strut member having a top end, formed by the bridge of said U-shape, and a bottom end, comprising the ends of the spaced apart legs of said U-shape, said ends of said legs being connectable to respective sides of said frame of said bicycle to connect said rack to said bicycle;

an elongated top member having a front end adapted to be connected to the frame of a bicycle and a mid-portion overlying and being connected to said top end of said strut member;

side members extending from each side of said top member and attached to a respective leg of said U-shaped strut member;

each said side member being substantially V-shaped and having an apex and two legs, the ends of the legs being connected to respective ends of the top member at respective sides thereof, each apex being connected to a respective leg of the strut member; and an interface means on one leg of at least one of said side members, said interface means engaging said clip means to releasably attach said side container to said rack;

wherein said clip means on said container comprises a clip wall having a top edge, a front end and a rear end, an elongated inverted L-shaped hook extending outwardly from said clip wall adjacent said top edge, and further including a front stabilizer adjacent the front end and a rear stabilizer adjacent the rear end said front stabilizer and said rear stabilizer extending outwardly from said clip wall;

said interface means of said rack comprising;

an interface wall defined by said one leg of said side member and having a top edge and a bottom edge;
  i) an elongated outwardly L-shaped hook extending from said interface wall adjacent said bottom edge and having a front end and a rear;
  ii) a butt at the end of said L-shaped hook adjacent said front end;
  iii) a front stopper on said interface wall adjacent said front end;
  iv) a rear stopper on said interface wall adjacent said top edge and said rear end;

whereby once said container is mounted on said rack, said L-shaped hook engages said inverted L-shaped hook, said rear stabilizer underlies said rear stopper, said front stabilizer underlies said front stopper and the front end of said rotated L-shaped hook abuts said butt.

2. A rack as defined in claim 1 wherein said at least one side wall of said container has a top edge and a bottom edge, and further including a cavity at the bottom edge of said side wall;

said rack further including;

a bottom clip including a bottom clip hook for engaging said cavity when said container is mounted on said rack.

3. A rack as defined in claim 2 wherein said container has a top wall, a parting line along said side wall defining a cover and along which said cover is opened up, said parting line extending at a first angle to said top wall, said clip being mounted below said parting line and in alignment therewith;

wherein the angle of said one leg to said top member is equal to said first angle;

whereby, said rack supports said container below the parting line thereof.

4. A rack as defined in claim 3 wherein said bicycle has a seat, said elongated top member having a first end for facing said seat;
adjustable fastening arms extending from said first end to adjustably position said rack;
the free ends of said fastening arms being removably attached to said frame.

5. A rack as defined in claim 4 and including a separate interface on each said side member whereby a separate container can be mounted on each side member.

6. A rack as defined in claim 5 adapted to be mounted over the back wheel of said bicycle.

7. A rack as defined in claim 6 and including a locking means at a top corner thereof;
said locking means comprising a locking cylinder disposed at an angle to said elongated top member and having a cam means turnable by said locking cylinder;
a cam housing for housing said cam when said lock is in its unlocked condition.

8. In combination, a bicycle rack and side container arrangement, said bicycle rack being mountable on the frame of said bicycle;
said bicycle rack releasably supporting said side container;
said side container comprising at least one side wall and including clip means on said one side wall;
said rack comprising:
a substantially inverted U-shaped strut member having a top end, formed by the bridge of said U-shape, and a bottom end comprising the ends of the spaced apart legs of said U-shape, said ends of said legs being connectable to respective sides of said frame of said bicycle to connect said rack to said bicycle;
an elongated top member having a front end adapted to be connected to the frame of a bicycle and mid-portion overlying, and being connected to, said top end of said strut member;
side members extending from each side of said top member and attached to a respective leg of said U-shaped strut member;
each said side member being substantially V-shaped having an apex and two legs, the ends of the legs being connected to respective ends of the top member at respective sides thereof, each apex being connected to a respective leg of the strut member; and
an interface means on one leg of at least one of said side members, said interface means engaging said clip means to releasably attach said side container to said rack;
wherein said clip means on said container comprises a clip wall having a top edge, a front end and a rear end, an elongated inverted L-shaped hook extending outwardly from said clip wall adjacent said top edge, and further including a front stabilizer adjacent the front end and a rear stabilizer adjacent the rear end, said front stabilizer and said rear stabilizer extending outwardly from said clip wall;
said interface means of said rack comprising;
an interface wall defined by said one leg of said side member and having a top edge and a bottom edge;
 i) an elongated L-shaped hood extending outwardly from said interface wall adjacent said bottom edge and having a front end and a rear end;
 ii) a butt at the end of said L-shaped hook adjacent said front end;
 iii) a front stopper on said interface wall adjacent said front end;
 iv) a rear stopper on said interface wall adjacent said top edge and said rear end;
whereby once said container is mounted on said rack, sad L-shaped hook engages said inverted L-shaped hook, said rear stabilizer underlies said rear stopper, said front stabilizer underlies said front stopper and the front end of said rotated L-shaped hook abuts said butt.

9. A combination as defined in claim 8 wherein said at least one side wall of said container has a top edge and a bottom edge, and further including a cavity at the bottom edge of said side wall;
said rack further including;
a bottom clip including a bottom clip hook for engaging said cavity when said container is mounted on said rack.

10. A combination as defined in claim 9 wherein said container has a top wall, a parting line along said side wall defining a cover and long which said cover is opened up, said parting line extending at a first angle to said top wall, said clip being mounted below said parting line and in alignment therewith;
wherein the angle of said one leg to said top member is equal to said first angle;
whereby, said rack supports said container below the parting line thereof.

11. A combination as defined in claim 10 wherein said bicycle has a seat, said elongated top member having a first end for facing said seat;
adjustable fastening arms extending from said first end to adjustably position said rack;
the free ends of said fastening arms being removably attached to said frame.

12. A combination as defined in claim 11 and including a separate interface on each said side member whereby a separate container can be mounted on each side member.

13. A combination as defined in claim 12 adapted to be mounted over the back wheel of said bicycle.

14. A combination as defined in claim 13 and including a locking means at a top corner thereof;
said locking means comprising a locking cylinder disposed at an angle to said elongated top member ad having a cam means turnable by said locking cylinder;
a cam housing for housing said cam when said lock is in its unlocked condition;
a cavity in said container for receiving said cam;
said cavity comprising a vertical opening and a tapered opening;
wherein, when said cam is in said cavity to thereby lock said container to said rack, said cam abuts a wall of said tapered opening.

15. A bicycle rack for mounting on the frame of a bicycle, and being adapted to support at least one side container, said side container having at least one side wall and having a clip means mounted on said one side wall;
said rack comprising;
a substantially inverted U-shaped strut member having a top end, formed by the bridge of said U-shape, and a bottom end, comprising the ends of the spaced apart legs of said U-shape, said ends of said legs being connectable to respective sides of said frame of said bicycle to connect said rack to said bicycle;

said members having front ends adapted to be connected to the frame of a bicycle and being attached to a respective leg of said U-shaped strut member; and an interface means on at least one of said side members, said interface means engaging said clip means to releasably attach said side container to said rack;

wherein said clip means on said container comprises a clip wall having a top edge, a front end and a rear end, an elongated inverted L-shaped hook extending outwardly from said clip wall adjacent said top edge, and further including a front stabilizer adjacent the front end and a rear stabilizer adjacent the rear end said front stabilizer and said rear stabilizer extending outwardly from said clip wall;

said interface means of said rack comprising;

an interface wall defined by said at least one side member and having a top edge and a bottom edge;
  i) an elongated L-shaped hook extending outwardly from said interface wall adjacent said bottom edge and having a front end and a rear end;
  ii) a butt at the end of said L-shaped hook adjacent said front end;
  iii) a front stopper on said interface wall adjacent said front end;
  iv) a rear stopper on said interface wall adjacent said top edge and said rear end;

whereby once said container is mounted on said rack, said L-shaped hook engages said inverted L-shaped hook, said rear stabilizer underlies said rear stopper, said front stabilizer underlies said front stopper and the front end of said rotated L-shaped hook abuts said butt.

16. A rack as defined in claim 15 wherein said at least one side wall of said container has a top edge and a bottom edge, and further including a cavity at the bottom edge of said side wall;

said rack further including;

a bottom clip including a bottom clip hook for engaging said cavity when said container is mounted on said rack.

17. A rack as defined in claim 16 wherein said container has a top wall, a parting line along said side wall defining a cover and along which said cover is opened up, said parting line extending at a first angle to said top wall, said clip being mounted below said parting line and in alignment therewith;

wherein said interface means is mounted at an interface angle equal to said first angle;

whereby, said rack supports said container below the parting line thereof.

18. A rack as defined in claim 17 wherein said side members comprise a first side leg extending from a first leg of said strut member in one direction;

a second side leg extending from the second leg of said strut member in said one direction;

a cross-member joining the free end of said first side leg to the free end of said second side leg; and a transverse member connecting said cross-member to said top end of said strut member.

19. A rack as defined in claim 18 and including a separate interface on each said side member whereby a separate container can be mounted on each side member.

20. A rack as defined in claim 17 wherein said side members are formed in the shape of a U having a first side leg and a second side leg joined by a connecting bridge;

the free ends of said U-shaped member each being joined to a respective leg of said strut member;

a lateral member connecting said connecting bridge to the top end of said strut member.

21. A combination as defined in claim 20 and including a separate interface on each said side member whereby a separate container can be mounted on each side member.

22. A rack as defined in claim 17 wherein said side members comprise a first plate connected to one leg of said strut member and a second plate connected to the other leg of said strut member;

a cross-member connecting the free ends of said first and second plates.

23. A combination as defined in claim 22 and including a separate interface on each said side member whereby a separate container can be mounted on each side member.

24. A rack as defined in claim 17 wherein said side members comprise a first plate mounted centrally on a first leg of said strut member and a second plate mounted centrally on a second plate of said strut member.

25. A combination as defined in claim 24 and including a separate interface on each said side member whereby a separate container can be mounted on each side member.

26. In combination, a bicycle rack and side container arrangement, said bicycle rack being mountable on the frame of said bicycle;

said bicycle rack releasably supporting said side container;

said side container comprising at least one side wall and including clip means on said one side wall;

said rack comprising;

a substantially inverted U-shaped strut member having a top end, formed by the bridge of said U-shape, and a bottom end comprising the ends of the spaced apart legs of said U-shape, said ends of said legs being connectable to respective sides of said frame of said bicycle to connect said rack to said bicycle;

side members having front ends adapted to be connected to the frame of a bicycle and being attached to a respective leg of said U-shaped strut member; and an interface means on at least one of said side members, said interface means engaging said clip means to releasably attach said side container to said rack;

wherein said clip means on said container comprises a clip wall having a top edge, a front end and a rear end, an elongated inverted L-shaped hook extending outwardly from said clip wall adjacent said top edge, and further including a front stabilizer adjacent the front edge and a rear stabilizer adjacent the rear edge, said front stabilizer and said rear stabilizer extending outwardly from said clip wall;

said interface means of said rack comprising;

an interface wall defined by said at least one side member and having a top edge, a bottom edge;
  i) an elongated L-shaped hook extending outwardly from said interface wall adjacent said bottom edge and having a front end on a rear end;
ii) a butt at the end of said L-shaped hook adjacent said front end;
iii) a front stopper on said interface wall adjacent said front end;
iv) a rear stopper on said interface wall adjacent said top edge and said rear end;
whereby once said container is mounted on said rack, said L-shaped hook engages said inverted L-shaped hook, said rear stabilizer underlies said rear stopper, said front stabilizer underlies said front stopper and the front end of said rotated L-shaped hook abuts said butt.

27. A combination as defined in claim 26 wherein said at least one side wall of said container has a top edge and a bottom edge, and further including a cavity at the bottom edge of said side wall;
said rack further including;
a bottom clip including a bottom clip hook for engaging said cavity when said container is mounted on said rack.

28. A combination as defined in claim 27 wherein said container has a top wall, a parting line along said side wall defining a cover and along which said cover is opened up, said parting line extending at a first angle to said top wall, said clip being mounted below said parting line and in alignment therewith;
wherein said interface means is mounted at an interface angle equal to said first angle;
whereby, said rack supports said container below the parting line thereof.

29. A combination as defined in claim 27 wherein said side members comprise a first side leg extending from a first leg of said strut member in one direction;
a second side leg extending from the second leg of said strut member in said one direction;
a cross-member joining the free end of said first side leg to the free end of said second side leg;
a transverse member connecting said cross-member to said top end of said strut member.

30. A combination as defined in claim 29, and including a separate interface on each said side member whereby a separate container can be mounted on each side member.

31. A combination as defined in claim 27 wherein said side members are formed in the shape of a U having a first side leg and a second side leg joined by a connecting bridge;
the free ends of said U-shaped member each being joined to a respective leg of said strut member;
a lateral member connecting said connecting bridge to the top end of said strut member.

32. A combination as defined in claim 31, and including a separate interface on each said side member whereby a separate container can be mounted on each side member.

33. A combination as defined in claim 27 wherein said side members comprise a first plate connected to one leg of said strut member and a second plate connected to the other leg of said strut member;
a cross-member connecting the free ends of said first and second plates.

34. A combination as defined in claim 33, and including a separate interface on each said side member whereby a separate container can be mounted on each side member.

35. A combination as defined in claim 27 wherein said side members comprise a first plate mounted centrally on a first leg of said strut member and a second plate mounted centrally on a second plate of said strut member.

36. A combination as defined in claim 35, and including a separate interface on each said side member whereby a separate container can be mounted on each side member.

* * * * *

UNITED STATES PATENT AND TRADEMARK OFFICE
CERTIFICATE OF CORRECTION

PATENT NO. : 5,271,540
DATED : December 21, 1993
INVENTOR(S) : Robert D. Katz and David Mitchell It is certified that error appears in the above-indentified patent and that said Letters Patent is hereby corrected as shown below:

```
Column 6, line 22, "rotated" should read --inverted--.
Column 8, line 32, after "end" insert --,--; line 37, after
    "elongated" delete "outwardly"; line 38, before "from"
    insert --outwardly--; line 39, after "rear" insert --end--.
Column 9, line 67, change "hood" to --hook--.
Column 10, line 25, change "long" to --along--; line 50,
    change "ad" to --and--.
Column 11, line 5, change "said" to --side--.
Column 12, line 66, delete "," and insert --and--.
Column 13, line 1, change "on" to --and--.
Column 14, line 2, after "leg;" insert --and--.
```

Signed and Sealed this

Twelfth Day of September, 1995

Attest:

BRUCE LEHMAN

Attesting Officer     Commissioner of Patents and Trademarks